United States Patent [19]

Schmidlin

[11] 3,943,776
[45] Mar. 16, 1976

[54] FLUIDIC ACCELERATION SENSOR

[75] Inventor: Albertus E. Schmidlin, Caldwell, N.J.

[73] Assignee: The United States of America as represented by the Secretary of the Army, Washington, D.C.

[22] Filed: Dec. 23, 1974

[21] Appl. No.: 535,243

[52] U.S. Cl. .................................................. 73/515
[51] Int. Cl.² ........................................ G01P 15/02
[58] Field of Search .......... 73/515, 516 R, 514, 503

[56] References Cited
UNITED STATES PATENTS

| | | | |
|---|---|---|---|
| 2,958,137 | 11/1960 | Mueller | 73/516 R X |
| 2,966,802 | 1/1961 | Steen | 73/516 R |
| 3,091,971 | 6/1963 | Stedman | 73/515 |
| 3,104,552 | 9/1963 | Bouchard | 73/516 R X |
| 3,221,562 | 12/1965 | Borcher et al. | 73/515 |
| 3,501,946 | 3/1970 | Riordan et al. | 73/515 |
| 3,509,774 | 5/1970 | Evans | 73/515 |

Primary Examiner—James J. Gill
Attorney, Agent, or Firm—Nathan Edelberg; Robert P. Gibson; A. Victor Erkkila

[57] ABSTRACT

A fluidic G sensor for monitoring the acceleration or deceleration of a missile includes a hollow cylinder containing an inertial mass, e.g., a piston, which is supported by a diaphragm pressurized by gas. The gas pressure is supplied from an external source and is metered into the diaphragm chamber through a fixed orifice. Gas is discharged from the chamber through two vent orifices, one fixed and the other variable. The fixed vent orifice represents the output load and leads to a fluidic Schmitt Trigger. The variable vent orifice is modulated by diaphragm motion and serves to control the pressure under the diaphragm as a function of acceleration of the piston. A dashpot formed between the piston and the upper closed end of the cylinder, which contains a small orifice open to ambient pressure, is employed to damp the oscillation of the piston and thereby stabilize the output pressure.

4 Claims, 5 Drawing Figures

TRANSIENT DATA
15 G SENSOR

TRANSIENT DATA

TRANSIENT DATA

FLUIDIC ACCELERATION SENSOR

BACKGROUND OF THE INVENTION

In the flight of a missile, such as an aerospace vehicle, the launch trajectory is extremely important. A critical factor in this part of the flight is the propulsion system. Its performance can be measured in many ways using on board instruments for sensing pressure, temperature, fuel flow, etc. The most direct method for measuring the performance of the engine is to measure the acceleration which it produces on the vehicle. Conventional sensing methods require precise and complex mechanisms to develop a force signal proportional to the acceleration and to transmit this signal to the system, usually as an electrical signal. Precision pivots and flexures are needed together with bulky and heavy electrical transducers to read the signal.

SUMMARY OF THE INVENTION

An object of the invention is to provide a novel fluidic device for measuring the acceleration of a space vehicle or the like.

Another object is to provide a fluidic device of said type, which is highly reliable and accurate, of low cost and simple design having a minimum number of moving parts and imposing a minimum power drain on the fluid supply.

Other objects will become apparent from the following description of the invention.

In accordance with the present invention, there is provided a novel fluidic device for sensing the acceleration of an aerospace vehicle and the like, which comprises an inertial mass, such as a freely slidable piston, contained in a housing, e.g., a hollow cylinder, wherein the inertial mass is supported by a flexible diaphragm, which is pressurized by a fluid in a chamber below th diaphragm. The fluid pressure under the supporting diaphragm is supplied from an external source and is metered into the chamber under the diaphragm through a fixed orifice. Fluid is vented from the chamber through two outlet ports, one of which is a fixed orifice and the other a variable orifice. The variable orifice is modulated by the motion of the diaphragm and serves to control the pressure under the diaphragm as a function of (proportional to) the acceleration of the inertial mass. The fixed vent orifice represents the output load and leads to a Schmitt Trigger or other actuating device responsive to such output load. The closed cylinder space above the piston contains a small orifice, which is open to ambient, e.g., atmospheric, pressure. This space forms a dashpot, which is employed to damp the oscillation of the piston and thereby stabilize the output pressure.

Besides its use for sensing setback acceleration of a missile during launch and boost, the novel fluidic device of the present invention can also be employed to measure setforward deceleration due to aerodynamic drag.

The term inertial mass, as used in the specification and claims, denotes a body which is disposed in the fluidic device in such a manner that it is free to respond to a force of acceleration or deceleration when said device is subjected to such force.

DETAILED DESCRIPTION OF THE INVENTION

Figure 1:
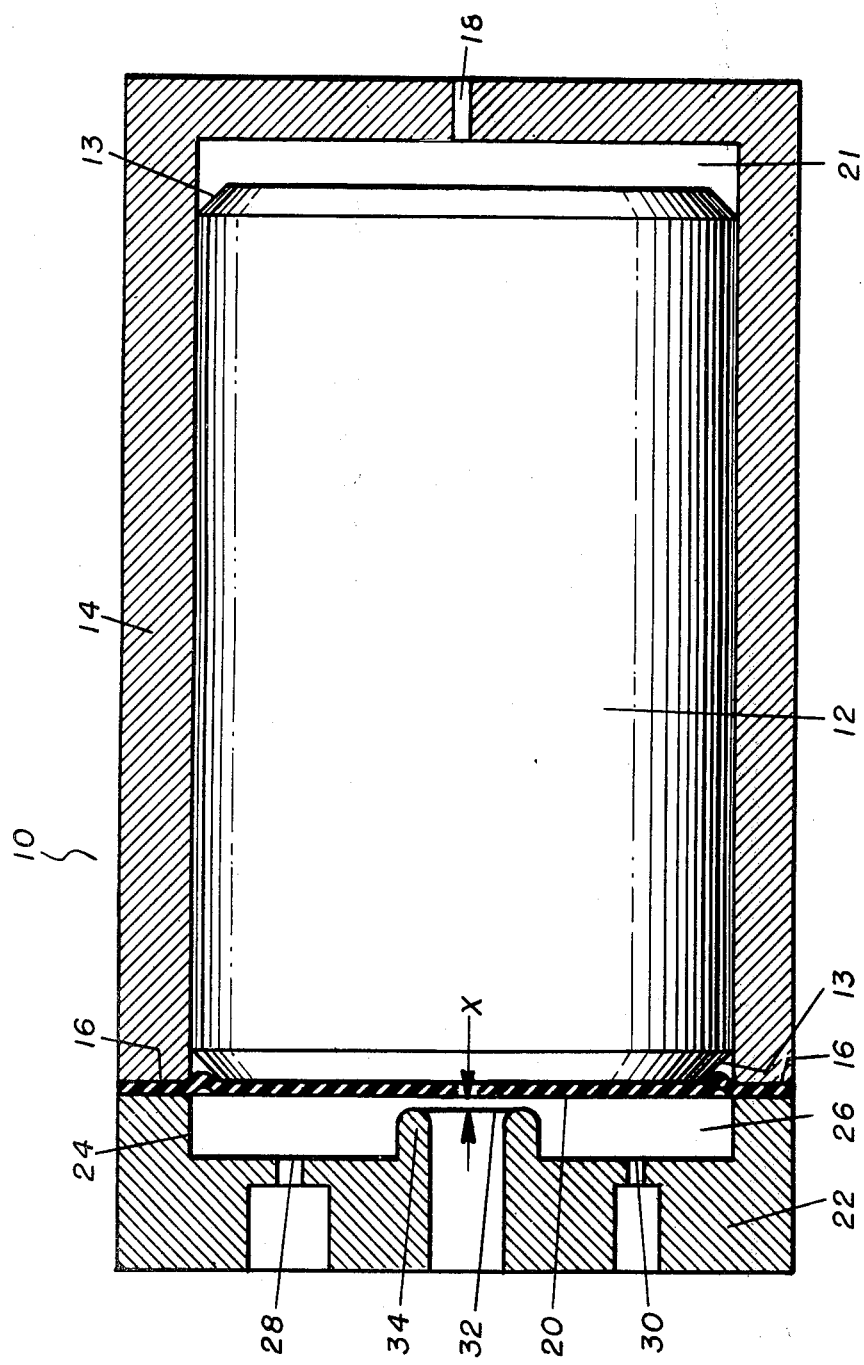
FIG. 1 is a schematic view of a fluidic accelerometer of the present invention.

Referring to FIG. 1, the fluidic accelerometer 10 comprises a piston 12, fabricated of aluminum or other suitable material, having beveled ends 13 and closely fitted but freely slidable in hollow cylinder 14 of suitable material, e.g., aluminum. The cylinder 14 is open at one end 16 and closed at the other end except for a small opening 18 communicating with the atmosphere. The piston is supported on a fluid impermeable diaphragm 20 of suitable flexible material, such as silicone rubber, and provides a clearance or chamber 21 above itself in the cylinder 14. Diaphragm 20 is clamped between the open end 16 of the cylinder 14 and an aluminum cover plate 22 by screws (not shown), which pass through said plate into the cylinder end. The cover plate 22 contains an annular raised rim or flange 24 equal in diameter to the hollow cylinder 14, thereby forming a chamber 26 between the diaphragm 20 and the cover plate 22. Also, the cover plate 22 is provided with one fixed fluid inlet orifice 28, one fixed fluid outlet or vent orifice 30, which is smaller than inlet orifice 28, and one variable fluid outlet or vent orifice 32, all of which communicate with the chamber 26 and are sized to ensure subsonic fluid flow. The variable fluid outlet orifice 32 is located in a raised annular portion 34 in the center of cover plate 22 so that the distance, $x$, between the variable outlet orifice 32 and the diaphragm 20 is substantially less than the distance between the diaphragm and each of the other orifices 28 and 30 located in the cover plate to the side of said variable vent orifice.

In operation, initially fluid under pressure, such as from a gas supply bottle, is introduced through the fixed fluid inlet orifice 28 into the chamber 26, thereby forcing the diaphragm 20 from its seat on the variable outlet orifice 32 and permitting the fluid to escape through said variable orifice. A small pressure is built up in the chamber 26 which corresponds to the gravitational attraction force or weight of the piston 12. As acceleration is applied to the accelerometer 10, the force acting upon the inertial mass, i.e., the aluminum piston 12, forces the diaphragm 20 down, thereby changing the distance $x$ between the diaphragm and the variable outlet orifice 32 and thus partially blocking said orifice. The resulting pressure buildup in chamber 26 is extremely sensitive to changes in the distance $x$ between the diaphragm 20 and the variable outlet orifice 32. At a given level of acceleration, a force balance is created in which the force on the piston 12 due to the pressure $P_c$ in chamber 26 balances the acceleration force, so that the piston comes to rest. The acceleration, $a$, is proportional to this value of pressure according to the equation $a = KP_c$, where K is a constant. The value of this pressure is a measure of acceleration. The fluid pressure in chamber 26, as vented through fixed outlet orifice 30, represents the output load of the accelerometer and is passed through a suitable conduit to a fluidic Schmitt Trigger or other actuating device responsive thereto.

Figure 2:
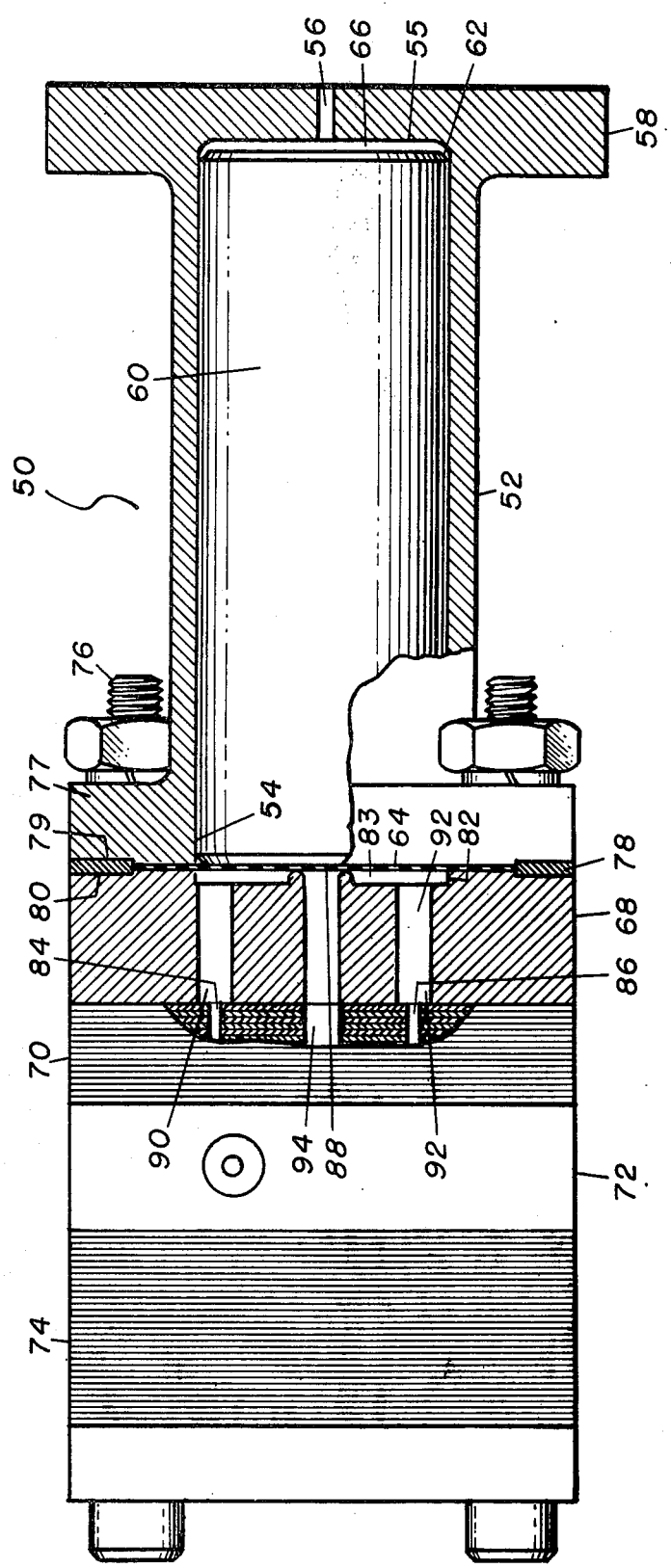
FIG. 2 is a partial cutaway view in longitudinal cross-section of a fluidic accelerometer of the present invention.

FIG. 2 shows a fluidic accelerometer of the present invention connected to a fluidic Schmitt Trigger. The fluidic accelerometer 50 comprises a hollow cylinder 52, which is open at one end 54 and closed at the other end 55 except for a small opening 56 communicating with the atmosphere. The closed end has a flange 58 containing bolts (not shown) for attaching the accelerometer to the missile. The cylinder 52 contains a piston 60 with beveled ends 62, which is supported on a flexible diaphragm of silicone rubber 64 and terminates short of the closed cylinder end 55 to form a chamber 66 containing opening 56. The cylinder 52 is attached to a transfer block 68, interconnecting plates 70, manifold block 72 and Schmitt Trigger 74 by bolts 76, which are fastened to flange 77 carried by the open end of cylinder 52. The diaphragm is clamped between the transfer block 68 and the flange 77, and an annular washer 78 is positioned in peripheral grooves 79 and 80 in flange 77 and transfer block 68, respectively, to prevent excessive (destructive) pressure from being applied to flexible diaphragm 64. The transfer block 68 contains a shallow cylindrical cup 82, which forms a chamber 83 with diaphragm 64. The cup 82 has one fixed fluid inlet orifice 84, one fixed fluid outlet orifice 86, which may or may not be smaller than inlet orifice 84, and one variable fluid outlet orifice 88 which is larger than both fixed orifices 84 and 86 and is located in a raised annular portion in the center of cup 82, the variable outlet orifice 88 being closer to diaphragm 64 than the other orifices 84 and 86. The orifices 84 and 86 are connected to chamber 83 by conduits 90 and 92. Inlet orifice 84 communicates with a conduit (not shown) through plates 70 and block 72 leading to a gas supply. Outlet orifice 86 communicates with a conduit (not shown) through plates 70 and block 72 leading to the Schmitt Trigger 74. The variable orifice 88 is connected to conduit 94, which communicates with a conduit (not shown) in plates 70 and block 72 leading to an atmospheric vent.

The device is operated as follows: Initially, pressure gas is introduced through the fixed fluid inlet orifice 84 into chamber 83, forcing diaphragm 64 from its seat on the variable outlet orifice 88 and thus permitting the gas to escape through said orifice. As the device is accelerated, the force acting on the piston 60 forces the diaphragm 64 down, which partially blocks orifice 88 and thus results in a pressure buildup in chamber 83. The gas pressure in chamber 83, which represents the output of the fluidic accelerometer 50, is vented through the fixed outlet orifice 86, and other conduits (not shown) to the fluidic Schmitt Trigger 74.

Figure 3:
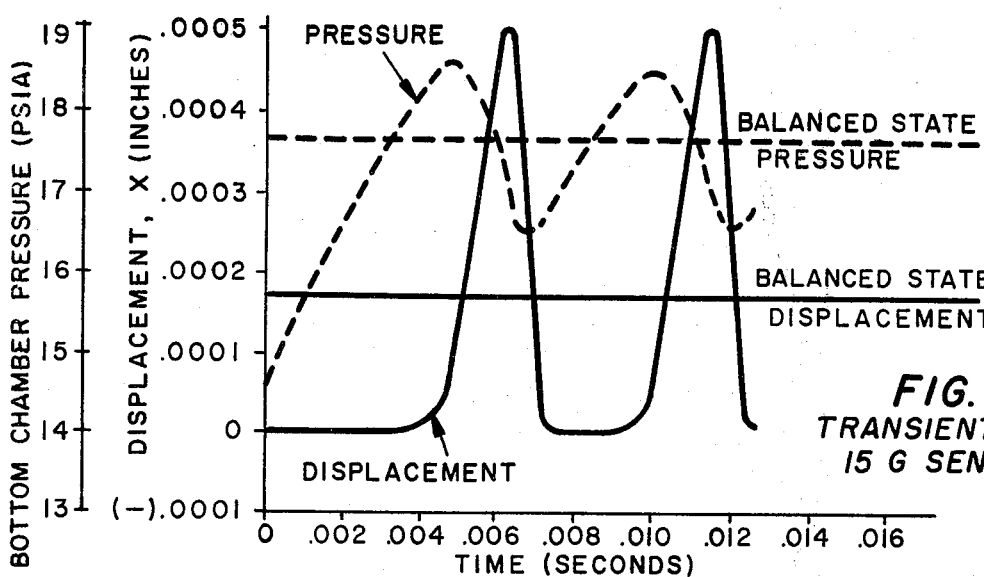
FIGS. 3 and 4 set forth curves showing the transient response to the simultaneous application of gas supply pressure and acceleration of a device, which does not incorporate damping.
Figure 4:
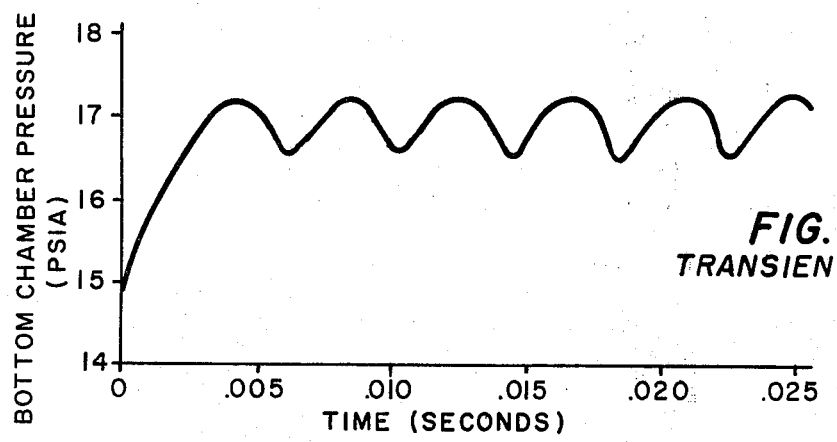

When an undamped device of the foregoing type is employed, the device limit cycles, i.e., it produces a continuous oscillation of the output pressure signal from the fixed outlet orifice (items 30 and 86 in FIGS. 1 and 2, respectively), which can last indefinitely and hence is generally unacceptable. For example, th transient response of a device, which does not incorporate damping, to the simultaneous application of fluid supply pressure and a 15 G step acceleration is shown in FIGS. 3 and 4. The operation of the device can be interpreted directly from FIG. 3. When the rising chamber 26 pressure reaches and exceeds the value necessary to balance the forces, the piston 12 begins to move. The pressure continues to rise until the piston reaches a displacement sufficient to balance the input and output flows. The pressure then begins to decrease, but is still above its balanced value and the displacement of the piston continues to increase. As the pressure drops below the balanced value, the displacement of the piston starts to decrease. When the displacement of the piston falls below the balanced value, the pressure begins to rise again and the device limit cycles. This lag between the pressure rise and piston displacement results primarily from the compressibility of the fluid and the kinetic energy of the mass.

The problem of limit cycling of the device can be overcome in a practical and simple manner by utilizing the top chamber volume 21 containing orifice 18 above the piston 12 as a dashpot to effect damping. The volume of the dashpot chamber 21 and size of the orifice 18 can be adjusted to provide the optimum damping effect. The orifice 18 can be a single opening or advantageously a porous plug, which distributes the fluid flow through a multiplicity of small openings over a relatively wide area and therefore is still operative in the event some openings become blocked for any reason. The use of the top chamber volume as a dashpot provides a simple and effective means for overcoming limit cycling and does not require any additional fluid consumption, any added size or weight or excessive manufacturing cost.

When damping is employed, an initial overshoot reading or peak in the pressure in chamber 26 and the output pressure signal from fixed outlet orifice 30 occurs when the fluid pressure is initially applied. As a result a discrete time is required for the output pressure to stabilize or settle. This overshoot reading is caused by the initial shock wave of the fluid flow and levels out quite rapidly at lower G levels due to less acceleration restraint of the inertial mass (piston).

Table I illustrates the effect of the head clearance (volume of the dashpot chamber 21) and top vent diameter (size of dashpot orifice 18) on the transient response characteristic (pressure in chamber 26) of a device illustrated in FIGS. 1 and 2 employing an aluminum piston of 0.5 in. diameter and 1.4 in. length.

TABLE I

| Example | No. G's | Supply Orifice Diameter (Inches) | Top Vent Diameter (Inches) | Head Clearance (Inches) | Supply Pressure (psig) | Limit Cycling Frequency (Hz) |
|---------|---------|----------------------------------|----------------------------|-------------------------|------------------------|------------------------------|
| I       | 14.21   | .018                             | .06                        | .02                     | 6                      | 286                          |
| II      | 14.21   | .010                             | .06                        | .02                     | 6                      | 242                          |
| III     | 14.21   | .031                             | .015                       | .02                     | 6                      | 222                          |
| IV      | 14.21   | .031                             | .01                        | .02                     | 6                      | 237                          |
| V       | 10.0    | .031                             | .06                        | .02                     | 6                      | 140                          |
| VI      | 10.0    | .031                             | .01                        | .02                     | 6                      | —                            |

Figure 5:
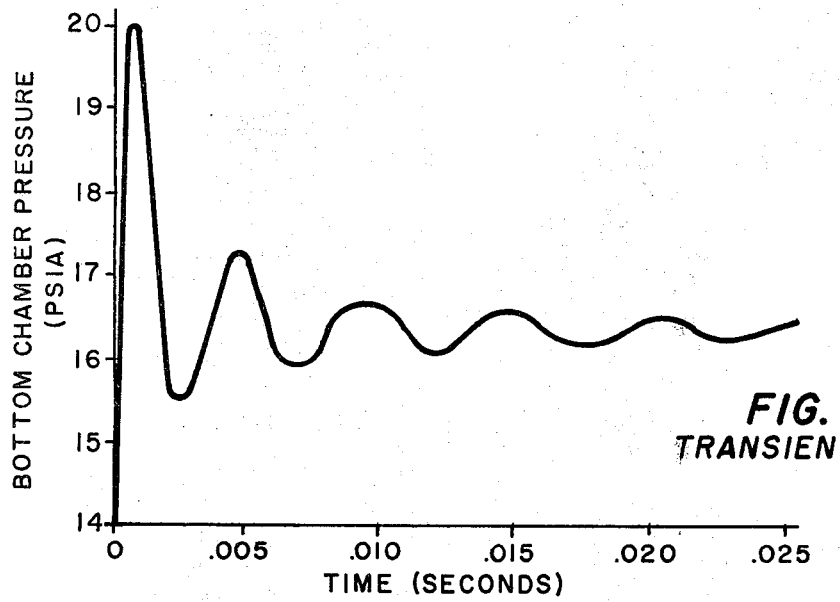
FIG. 5 shows the transient response to the simultaneous application of gas supply pressure and acceleration of a device, which incorporates damping.

A case where limit cycling ceases is illustrated by Example VI (FIG. 5) which reached a steady chamber 26 pressure in 30 msecs. (Compare Example V, FIG.

4). This case employed a 10G input and required approximately 10 times the flow of Case I at 14.21G. To provide a steady chamber 26 pressure at the 14.21G level a supply orifice of 0.04 inches in diameter was required. This introduced an appreciable increasse in gas flow. The transient response including the overshoot of pressure was comparable to FIG. 5.

The fluid accelerometer of the present invention operates with extremely small fluid consumption, which is of primary importance in small self-contained, compact, high performance systems. Of particular significance is the size of the fixed inlet orifice 28 which determines the fluid consumption of the device. Tests have shown that a 10 mil diameter inlet orifice can be employed with acceptable results, whereby the gas consumption is extremely small (about 1/20 standard cubic feet per minute (1 atmosphere at 70°F) using an aluminum piston of 0.5 in. diameter and 1.4 in. length and gas supply pressure of 5–10 psig.

It is preferred to employ a fluid pressurized diaphragm to support the piston in the fluid accelerometer. However, the invention is not limited thereto. Thus, by employing a piston, which is sufficiently closely fitted and lubricated as to prevent excessive flow of fluid between the piston and cylinder walls and be freely slidable within said cylinder, it is possible to support the piston by fluid pressure directly and thereby design and operate the fluidic accelerometer of the present invention, as described above, without the use of the supporting diaphragm.

The foregoing disclosure and drawings are merely illustrative of the principles of this invention and are not to be interpreted in a limiting sense. We wish it to be understood that we do not desire to be limited to exact details of construction shown and described, because obvious modifications will occur to a person skilled in the art.

I claim:

1. A fluidic device for sensing acceleration of a missile, which comprises:
    a tubular housing having a closed first end containing an orifice communicating with the atmosphere and a second end closed by a flexible diaphragm;
    an inertial mass slidably contained in said housing and supported by said diaphragm;
    a chamber having a wall including said diaphragm, said chamber having one fixed fluid inlet orifice, one fixed fluid outlet orifice and one variable fluid outlet orifice, wherein said variable fluid outlet orifice is modulated by the movement of said diaphragm; and
    a dashpot formed between said inertial mass and said housing closed first end containing said orifice;
    whereby when pressurized fluid is introduced through said fixed inlet orifice to pressurize said chamber and said diaphragm and the fluidic device is subjected to an acceleration force, the inertial mass due to said force exerts a counterpressure on said diaphragm, and causes said flexible diaphragm to move and thereby modulate said variable fluid outlet orifice so that the pressure in said chamber, including the output pressure signal from said chamber delivered through said fixed fluid outlet orifice, is proportional to said acceleration force, while said dashpot damps the oscillation of said inertial mass and thereby stabilizes said output pressure signal.

2. The device of claim 1, wherein the tubular housing is a hollow cylinder and the inertial mass is a piston.

3. The device of claim 1, wherein the distance between said variable fluid outlet orifice and said diaphragm is less than the distance between said diaphragm and said fixed fluid inlet and outlet orifices in said chamber.

4. The device of claim 3, wherein the orifice in said dashpot is a porous plug.

\* \* \* \* \*